US010782950B2

(12) United States Patent
Kuo et al.

(10) Patent No.: US 10,782,950 B2
(45) Date of Patent: Sep. 22, 2020

(54) FUNCTION PORTABILITY FOR SERVICES HUBS USING A FUNCTION CHECKPOINT

(71) Applicant: Amazon Technologies, Inc., Seattle, WA (US)

(72) Inventors: Calvin Yue-Ren Kuo, Mercer Island, WA (US); Cheng Pan, Bellevue, WA (US); Jeffrey Tarn, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/968,239

(22) Filed: May 1, 2018

(65) Prior Publication Data

US 2019/0339955 A1    Nov. 7, 2019

(51) Int. Cl.
| | |
|---|---|
| *G06F 8/60* | (2018.01) |
| *G06F 9/48* | (2006.01) |
| *H04L 29/08* | (2006.01) |
| *G06F 8/61* | (2018.01) |
| *G06F 9/50* | (2006.01) |
| *G06F 11/20* | (2006.01) |

(52) U.S. Cl.
CPC ............... *G06F 8/60* (2013.01); *G06F 9/485* (2013.01); *H04L 67/16* (2013.01); *G06F 8/61* (2013.01); *G06F 9/4856* (2013.01); *G06F 9/5088* (2013.01); *G06F 11/203* (2013.01); *H04L 67/10* (2013.01); *H04L 67/34* (2013.01)

(58) Field of Classification Search
CPC ... G06F 8/60; G06F 9/485; G06F 8/61; G06F 9/4856; G06F 9/5088; G06F 11/203; H04L 67/16; H04L 67/10; H04L 67/34

USPC .......................................................... 717/177
See application file for complete search history.

(56) References Cited

U.S. PATENT DOCUMENTS

| | | | |
|---|---|---|---|
| 8,281,317 B1 | 10/2012 | Backensto et al. | |
| 8,752,049 B1 * | 6/2014 | Backensto et al. | ..... G06F 9/485 718/100 |
| 2012/0011519 A1 | 1/2012 | Ganesh | |
| 2016/0132310 A1 * | 5/2016 | Koushik et al. | .......... G06F 8/60 717/176 |
| 2016/0285958 A1 | 9/2016 | Das et al. | |
| 2017/0093915 A1 * | 3/2017 | Ellis et al. | .............. H04L 67/10 |
| 2017/0155703 A1 * | 6/2017 | Hao et al. | ................ H04L 67/12 |
| 2017/0199770 A1 | 7/2017 | Peteva et al. | |
| 2018/0113770 A1 | 4/2018 | Hasanov et al. | |

* cited by examiner

*Primary Examiner* — Wei Y Zhen
*Assistant Examiner* — Mohammed N Huda
(74) *Attorney, Agent, or Firm* — Thorpe North & Western, LLP

(57) ABSTRACT

Technologies are described for creating a function checkpoint for an instance of a program code function located on a first services hub and using the function checkpoint to load the instance of the program code function on a second services hub. An example method may include creating a function checkpoint for an instance of a program code function loaded in memory of a first services hub, where the function checkpoint may contain execution instructions and execution state data for the instance of the program code function. A second services hub included in the local device network may be identified, and the function checkpoint may be sent to the second services hub to allow execution of the instance of the program code function to be loaded on the second services hub using the function checkpoint.

20 Claims, 11 Drawing Sheets

US 10,782,950 B2

FUNCTION PORTABILITY FOR SERVICES HUBS USING A FUNCTION CHECKPOINT

BACKGROUND

Electronic devices and computing systems have become ever-present in many aspects of society. Devices may be found in the workplace, at home, or at school. Computing systems may include computing and data storage systems to process and store data. Some computing systems have begun offering centralized, virtual computing options known as service provider environments that may reduce overall costs, improve availability, improve scalability, and reduce time to deploy new applications.

Advancements in communication technologies have allowed for even relatively simple electronic devices to communicate with other devices and computing systems included in a device network. For example, the Internet of Things (IoT) is the interconnection of computing devices scattered across the globe using Internet infrastructure. Such devices may be able to capture data, and securely communicate the data over a network to a centralized computing service in a service provider environment (e.g., "cloud" environment). In one example, the devices may send the data to a services hub or computing node in a local device network, and the services hub may forward the data received from the devices to the centralized computing service in the service provider environment. In addition, the services hub may provide services to devices connected to the services hub, such as data aggregation, local computing, messaging, or other services.

DETAILED DESCRIPTION

Figure 1A:
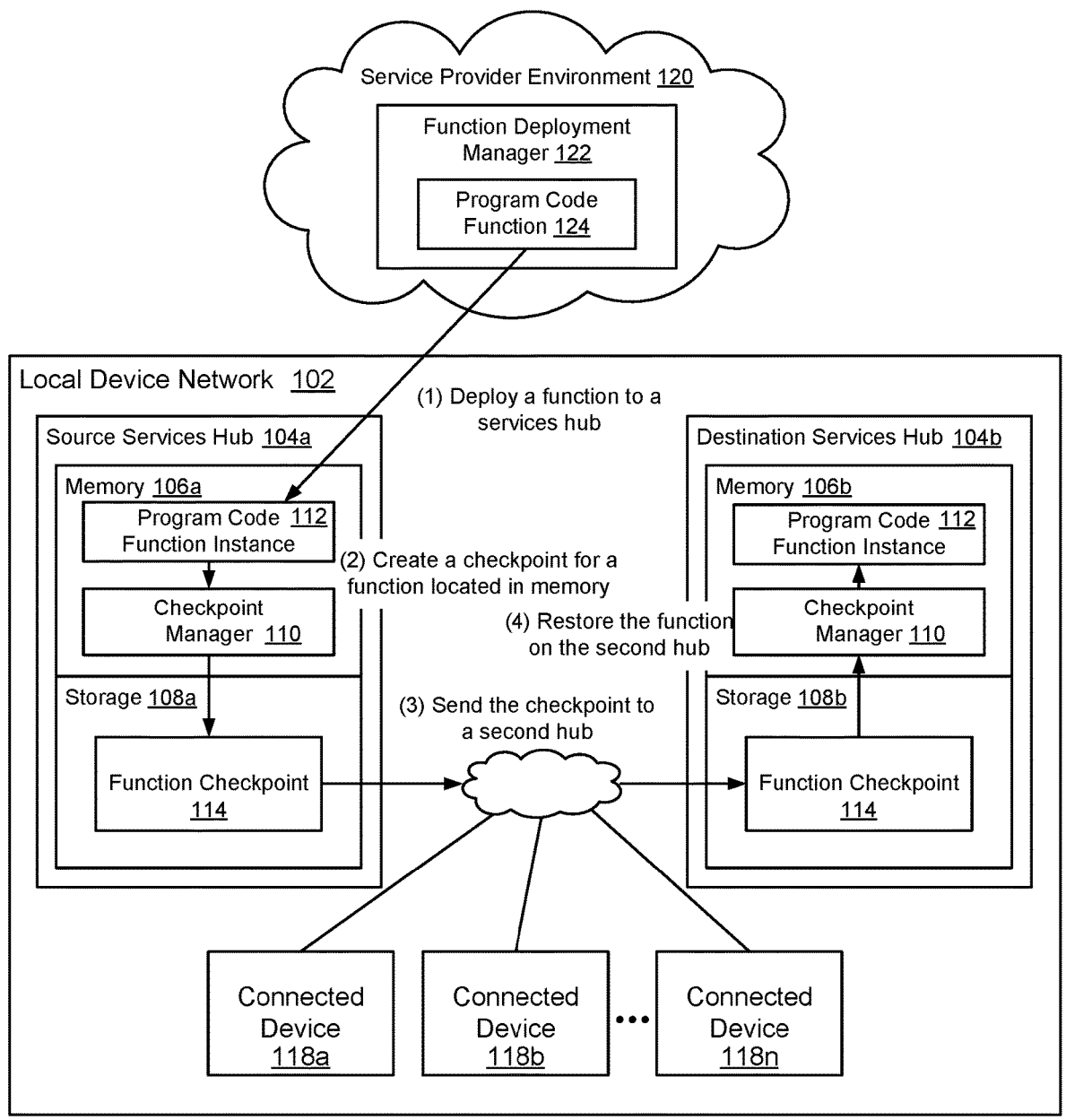
FIG. 1A illustrates an example system and method for generating a function checkpoint on a source services hub and transferring an instance of a program code function to a destination services hub using the function checkpoint.

Technologies are described for creating a function checkpoint for an instance of a program code function located on a source services hub and using the function checkpoint to execute the instance of the program code function on a destination services hub. A services hub may be included in a local device network, which also includes a plurality of connected devices. The services hub may be a computing device configured to provide services to connected devices included in the local device network and to communicate with computing systems included in a service provider environment (e.g., a "cloud" environment). For example, the services hub may provide services that include, but are not limited to: a message service, a program code function service, a device shadowing service, and user developed services. A service may be implemented using a program code function on a services hub, and as described below, an instance of the program code function may be moved from a source services hub to a destination services hub.

In one example configuration, an instance of a program code function executing on a source services hub may be moved to a destination services hub included in a local device network by suspending execution of the instance of the program code function on the source services hub and creating a function checkpoint for the instance of the program code function. In one example, a function checkpoint may comprise one or more checkpoint image files that contain execution instructions and execution state data obtained from the memory of the source services hub. The function checkpoint may be used to preserve an execution state of an instance of a program code function prior to being suspended on a source services hub, and execution instructions and execution state data included in the function checkpoint may be used to resume the execution state of the instance of the program code function on a destination services hub. Also, function metadata related to execution of an instance of a program code function on a source services hub may be collected. The function metadata may be used to facilitate restoring the execution state of the instance of the program code function on a destination services hub.

After creating the function checkpoint for the instance of the program code function on the source services hub, the function checkpoint may be sent to a destination services hub located in a local device network which has been identified as being available to host the instance of the program code function. In one example, the function checkpoint may be sent directly to the destination services hub over a local wireless network or over a wired network. In another example, the function checkpoint may be sent to a service provider environment for distribution to the destination services hub, as described later. In yet another example, the function checkpoint may be sent to a service provider environment to be hosted on a computing instance located in the service provider environment. After receiving the function checkpoint, the destination services hub may be configured to resume the execution state of the instance of the program code function by loading the execution instructions and execution state data included in the function checkpoint into the memory of the destination services hub.

To further describe the present technology, examples are now provided with reference to the figures. FIG. 1A is a diagram illustrating an example system and method used to generate a function checkpoint 114 for an instance of a program code function 112 (also referred to as a program code function instance 112) executing on a source services hub 104a and restoring the instance of the program code function 112 on a destination services hub 104b using the function checkpoint 114. FIG. 1 illustrates that a local device network 102 may include a plurality of services hubs 104a-b and a plurality of connected devices 118a-n. As will be appreciated, the local device network 102 can include any number of services hubs 104a-b and connected devices 118a-n. A local device network 102 may be implemented within a business environment (e.g., manufacturing environment, office environment, retail environment, etc.), home environment, recreational environment, as well as any other suitable environment. In some examples, a local device network 102 may be in communication, via a wide area network (WAN), with an external network, such as a service provider environment (e.g., "cloud" environment), as described later.

A services hub 104a-b may be a computing device configured to host software that provides various services to connected devices 118a-n included in a local device network 102. The software hosted on the services hub 104a-b may extend service provider environment capabilities to connected devices 118a-n, allowing the services hub 104a-b to host, for example, storage and compute services used to collect and analyze information generated by the connected devices 118a-n, and allowing the services hub 104a-b to host a message service used by connected devices 118a-n to securely communicate with one another. Also, users (including customers of a service provider) may develop software applications and/or program code functions (e.g., "serverless" functions) for services which may be deployed to, and executed on, a services hub 104a-b within a local device network 102. As an illustration, a user may create a program code function that publishes a message to subscribed connected devices in response to an event, and the user may deploy the program code function to a services hub 104a-b in a local device network 102. Invoking a service on a services hub 104a-b may comprise loading an instance of a program code function 112 (i.e., an instance of a software application or program code function) into memory 106a-b (e.g., random access memory (RAM)) of a services hub 104a-b.

An instance of a program code function 112 may be on-demand or long-lived. Illustratively, an on-demand program code function may be invoked in response to a request or event where little to no state information is maintained during execution of the program code function 112, and the program code function 112 may be terminated upon completion. A long-lived program code function may be stateful and may be used to provide an ongoing service, such as listening for requests and forwarding external events.

As illustrated in one example configuration, a program code function 124 may be deployed to a services hub 104a included in a local device network 102. In one example, a user may submit the program code function 124 to a function deployment manager 122 located in a service provider environment 120, and the function deployment manager 122 may be used to send the program code function 124 to a services hub 104a. For example, the function deployment manager 122 may include a user interface that allows a user to submit the program code function 124 for deployment to one or more services hubs 104a-b included in the user's local device network 102. In one example, the function deployment manager 122 may be configured to select which services hub 104a-b may receive deployment of the program code function 124. As such, the program code function may be transparently deployed to any of the services hubs 104a-b included in the user's local device network 102. In another example, the user may specify which services hub 104a-b to deploy the program code function 124. After selecting a services hub 104a-b, the function deployment manager 122 may cause the program code function 124 (e.g., a program code function file) to be sent to the selected services hub 104a-b. In response to receiving the program code function 124, a services hub 104a-b may load an instance of the program code function 112 for execution on the services hub 104a-b.

An instance of a program code function 112 loaded for execution on a source services hub 104a may be moved to a destination services hub 104b. An instance of a program code function 112 may be moved from a source services hub 104a to a destination services hub 104b for various reasons. For example, an instance of a program code function 112 may be moved to a destination services hub 104b when computing resources (e.g., processor, memory 106a, and/or network bandwidth) of the source services hub 104a are overloaded, when the health state of the source services hub 104a becomes unstable, or when a load of a source services hub 104a is redistributed to a destination services hub 104b that has been added to a local device network 102. Of course, moving an instance of a program code function 112 from a source services hub 104a to a destination services hub 104b may be performed for reasons other than those described above.

Selecting an instance of a program code function 112 to be moved to a destination services hub 104b may, in one example, be performed using selection criteria. Non-limiting examples of selection criteria may include: a function type, function execution state, function completion state and/or resource allocation. The function type may indicate whether an instance of a program code function 112 is on-demand or long-lived. Illustratively, a long-lived program code function may be selected over a short-lived program code function for migration to a destination services hub 104b due to a desire to preserve the state information of the long-lived program code function. The function execution state may indicate whether an instance of a program code function 112 is idle. Illustratively, an idle instance of a program code function may be selected over an active instance of a program code function in order to avoid having to suspend the active instance of the program code function. The function completion state may indicate a percentage complete of an instance of a program code function 112. Illustratively, an instance of a program code function 112 that has recently been invoked may be selected over an instance of a program code function 112 that is near completion in order to allow a nearly complete program code function to complete execution on a source services hub 104a. An amount of resources (e.g., processor and memory) allocated to an instance of a program code function 112 may be used as one criterion to determine whether to move an instance of a program code function 112 to a destination services hub 104b. For example, an instance of a program code function 112 that has been allocated fewer resources may be selected because the amount of data to be written to a checkpoint file may be less as compared to that of other program code functions. As will be appreciated, any selection technique may be used to select an instance of a program code function 112 for migration to a destination services hub 104b, including systematically or randomly selecting an instance of a program code function 112 from a process table used by an operating system to manage instances of program code functions 112.

Moving an instance of a program code function 112 from a source services hub 104a to a destination services hub 104b may include creating a function checkpoint 114 for the program code function 112. The function checkpoint 114 may include one or more files that contain execution instructions (e.g., computer code) and execution state data (e.g., function resources obtained from memory 106a) for the program code function 112. In one example, a software container used to execute an instance of a program code function 112 may be moved to a destination services hub 104b by creating a function checkpoint 114 for the software container that includes a set of image files that may be used to recreate the software container, run-time environment, and an execution state of the instance of the program code function 112 on the destination services hub 104b. In some examples, a function checkpoint 114 may include one or more data objects or data store records containing execution instructions and execution state data. Also, in one example, metadata related to executing an instance of a program code function 112 on a source services hub 104a may be collected and the metadata may be included along with a function checkpoint 114, or included in a function checkpoint 114. Illustratively, the metadata may include execution state information for an instance of a program code function 112 (e.g., idle or executing), computing resource allocation information for the program code function 112, logging messages, command line arguments and/or parameters, software application resource names or program code function resource names, and the like.

In one example, as illustrated in FIG. 1, the services hubs 104a-b may include a checkpoint manager 110 (e.g., a checkpoint daemon) used to preserve and resume an execution state of an instance of a program code function 112. For example, an instance of the checkpoint manager 110 located on a source services hub 104b may be used to create a function checkpoint 114 for an instance of a program code function 112 located in the memory 106a of the source services hub 104a. An instance of the checkpoint manager 110 on a destination services hub 104b may be used to resume the program code function 112 in the memory 106b of the destination services hub 104b using the execution state information included in the function checkpoint 114. Accordingly, an instance of the checkpoint manager 110 may be installed on each services hub 104a-b included in a local device network 102, allowing the services hubs 104a-b to move instances of program code functions 112 between the services hubs 104a-b.

In one example, creating a function checkpoint 114 for an instance of a program code function 112 using the checkpoint manager 110 may include suspending execution of the program code function 112 on a source services hub 104a and obtaining execution instructions and execution state data for the program code function 112 from the memory 106a of the source services hub 104a. The execution instructions and execution state data may then be written to a function checkpoint 114 created in a persistent storage 108a of the source services hub 104a. As a non-limiting example, the checkpoint manager 110 may use a process identifier for an instance of a program code function 112 to identify a process tree in a process file system located in memory 106a. The checkpoint manager 110 may navigate the process tree to identify any tasks (e.g., threads and children processes) that are included in the process tree. After identifying the tasks included in the process tree, the checkpoint manager 110 may suspend the tasks using a system call. Suspending the tasks may prevent the tasks from changing the execution state of the program code function 112. For example, suspending a task may prevent the task from opening a new file, opening a new socket, changing session variables, producing new children processes, etc. The checkpoint manager 110 may navigate a process directory in the process file system to gather execution instructions and execution state data for the program code function 112 and write the execution instructions and execution state data to a function checkpoint 114 in persistent storage 108a of the source services hub 104a.

After creating a function checkpoint 114, the function checkpoint 114 may be sent to a destination services hub 104b. Identifying a destination services hub 104b to host an instance of a program code function 112 may include, in one example, referencing a migration configuration file (shown in FIG. 4) that assigns a destination services hub 104b to host instances of program code functions 112 moved from a source services hub 104a. As one example, services hubs 104a-b in a local device network 102 may be grouped together and members of the group may be assigned to host instances of program code functions moved from other members of the group. In another example, a destination services hub 104b may be identified based in part on a computing workload of the destination services hub 104b. For example, a migration management module (shown in FIG. 4A) may be used to evaluate computing workloads of services hubs 104a-b included in a local device network 102 and identify a destination services hub 104b that has a lower computing workload as compared to other services hubs 104a-b in the local device network 102. A computing workload of a services hub 104a-b may refer to an amount of processing being performed on the services hub 104a-b. The computing workload may include a number of instances of program code functions and/or software applications executing on the services hub 104a-b and a number of connected devices 118a-n that may be connected to and interacting with the services hub 104a-b. A function checkpoint 114 may be sent from a source services hub 104a to a destination services hub 104b over a local area network (LAN) using a network protocol, such as, but not limited to: WI-FI, Zigbee, Z-Wave, BLUETOOTH, NFC (Near Field Communication), cellular, a wired connection, and the like.

In response to receiving a function checkpoint 114 from a source services hub 104a, the function checkpoint 114 may be stored to a persistent storage 108b (e.g., hard disk drive, solid-state drive, or any non-volatile storage device) on the destination services hub 104b, and a checkpoint manager 110 located on the destination services hub 104b may load an instance of a program code function 112 in memory 106b for execution using the execution state information included in the function checkpoint 114. For example, the checkpoint manager 110 may load the function checkpoint 114 into memory 106b and recreate the program code function 112 using the execution instructions and execution state data included in the function checkpoint 114. Also, function metadata included with the function checkpoint 114 may be used to restore the instance of the program code function 112 on the destination services hub 104b. As a non-limiting example, the checkpoint manager 110 may create an entry in a process table used by an operating system to manage instances of program code functions 112 and recreate resources utilized by the program code function 112, including namespaces, sockets, memory mappings, timers, credentials, and threads, as well as identify which resources are shared between process tasks. In a case where a software container that includes an instance of a program code function 112 is moved to the destination services hub 104b, the checkpoint manager 110 may load the software container (including the program code function 112 contained in the software container) in the memory 106b of the destination services hub 104b using the function checkpoint 114. After the program code function 112 has been recreated on the destination services hub 104b, the program code function 112 may resume execution, allowing connected devices 118a-n that utilize a service provided by the program code function 112 to access the service on the destination services hub 104b.

The migration of the program code function 112 from the source services hub 104a to the destination services hub 104b may be transparent to a user of a local device network 102. That is, a user may be unaware of which services hubs 104a-b included in the user's local device network 102 host an instance of a program code function 112. As such, a user may deploy a software application or program code function for execution on any of the services hubs 104a-b included in the owner's local device network 102, and an instance of a program code function 112 (i.e., an instance of the software application or program code function) may be moved between the services hubs 104a-b as needed without the user being aware that the program code function 112 has been moved.

Figure 1B:
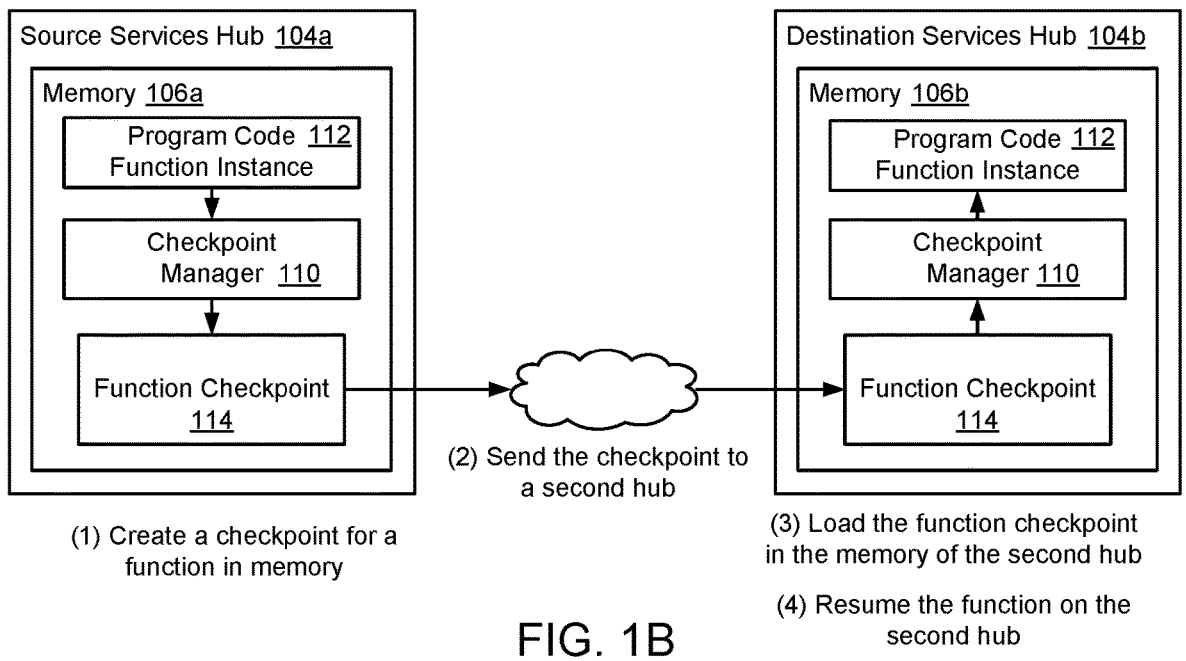
FIG. 1B is an illustration of an example system and method for transferring a function checkpoint from a source services hub to a destination services hub.

FIG. 1B illustrates an example method for transferring a function checkpoint 114 created for an instance of a program code function 112 from a memory 106a of a source services hub 104a to a memory 106b of a destination services hub 104b. As described above, a checkpoint manager 110 located on a source services hub 104b may be used to create a function checkpoint 114 for an instance of a program code function 112 located in the memory 106a of the source services hub 104a. In the example, illustrated, the checkpoint manager 110 may be configured to create the function checkpoint 114 in memory 106, wherein the memory 106a may be volatile memory. The function checkpoint 114 may then be sent to a destination services hub 104b via a network (e.g., a local area network (LAN)), or in another example, via a service provider environment as described below in association with FIG. 2.

The function checkpoint 114 may be received at the destination services hub 104, and a checkpoint manager 110 on the destination services hub 104b may be used to load the instance of the program code function 112 in the memory 106b of the destination services hub 104b using the execution state information included in the function checkpoint 114. As an example, at the time the function checkpoint 114 is received at the destination services hub 104b, the function checkpoint 114 may be loaded into volatile memory, without ever having stored the function checkpoint 114 in persistent storage, and the checkpoint manager 110 may load the instance of the program code function 112 in the volatile memory using the execution instructions and the execution state data included in the function checkpoint 114.

Figure 2:
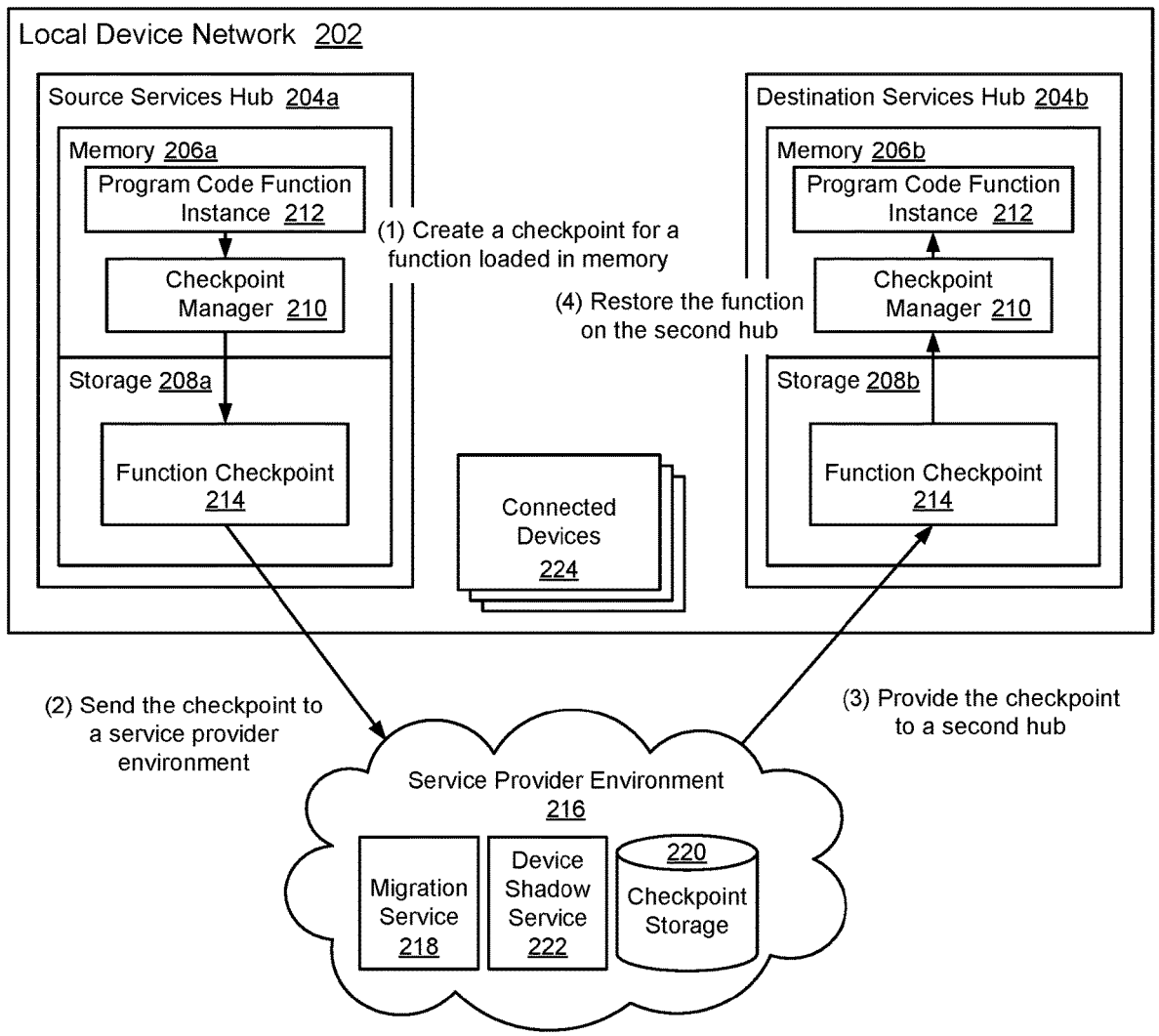
FIG. 2 is an illustration of an example system and method for generating a function checkpoint on a source services hub and providing the function checkpoint, via a service provider environment, to a destination services hub.

FIG. 2 is a diagram that illustrates an example system and method used to generate a function checkpoint 214 for an instance of a program code function 212 (also called a program code function instance 212) on a source services hub 204a and provide the function checkpoint 214, via a service provider environment 216, to a destination services hub 204b, allowing the instance of the program code function 212 to be resumed on the destination services hub 204b using the function checkpoint 214. As described earlier, a local device network 202 may include a plurality of services hubs 204a-b configured to provide services to connected devices 224. A service may be implemented on a services hub 204a-b by executing an instance of a software application or program code function (i.e., an instance of a program code function 212) on the services hub 204a-b.

Each of the services hubs 204a-b may include a checkpoint manager 210. The checkpoint manager 210 on a source services hub 204a may be used to create a function checkpoint 214 for an instance of a program code function 212 loaded in the memory 206a of a source services hub 204a, and store the function checkpoint 214 in persistent storage 208a on the source services hub 204a. The function checkpoint 214 may be sent to a destination services hub 204b and a checkpoint manager 210 on the destination services hub 204b may be used to retrieve the function checkpoint 214 from persistent storage 208b on the destination services hub 204b and load the instance of the program code function 212 in the memory 206b of the destination services hub 204b using the function checkpoint 214. The services hubs 204a-b may be in network communication with the service provider environment 216, which may include network services, such as data storage and retrieval services, on-demand processing capacity, and other services that may be accessible to the services hubs 204a-b.

As illustrated, after creating a function checkpoint 214 on a source services hub 204a, the source services hub 204a may send the function checkpoint 214 to the service provider environment 216 for distribution to a destination services hub 204b. In one example, the service provider environment 216 may include a migration service 218. The migration service 218 may be configured to forward a function checkpoint 214 to a destination services hub 204b. For example, in response to receiving a function checkpoint 214, the migration service 218 may identify a destination services hub 204b, and send the function checkpoint 214 to the destination services hub 204b. Illustratively, the migration service 218 may identify a destination services hub 204b that has been preassigned to host an instance of a program code function 212 migrated from a source services hub 204a, or the migration service 218 may select a destination services hub 204b that has a smaller computing workload as compared to other services hubs to host an instance of a program code function 212 moved from a source services hub 204a, or the migration service 218 may utilize a round robin selection technique to identify a destination services hub 204b to host an instance of a program code function 212 moved from a source services hub 204a.

In another example, a source services hub 204a may send a function checkpoint 214 to the service provider environment 216 to be stored in the service provider environment 216, allowing a destination services hub 204b to retrieve the function checkpoint 214 from the service provider environment 216. In one example, a function checkpoint 214 may be stored to a checkpoint storage 220, which may be a relational data store, NoSQL data store, object data store, or another type of data store. A destination services hub 204b may be configured to retrieve a function checkpoint 214 from the checkpoint storage 220. For example, a destination services hub 204b may periodically query the checkpoint storage 220 for a function checkpoint 214, or a destination services hub 204b may receive a notification that a function checkpoint 214 has been stored to the checkpoint storage 220. The destination services hub 204b may retrieve the function checkpoint 214 from the checkpoint storage 220, and the checkpoint manager 210 located on the destination services hub 204b may load an instance of a program code function 212 in the memory 206b of the destination services hub 204b using the function checkpoint 214.

In another example, a function checkpoint 214 may be stored using a device shadow service 222, which may be configured to manage device representations (e.g., data objects) used to represent the states of services hubs 204a-b. The device shadow service 222 may store a function checkpoint 214 to a device representation (not shown) for a destination services hub 204b, and as part of updating the state of the destination services hub 204b to a state indicated by the device representation, the destination services hub 204b may retrieve the function checkpoint 214 from the device representation and resume an instance of a program code function 212 into the memory 206b of the destination services hub 204b using the function checkpoint 214.

Figure 3:
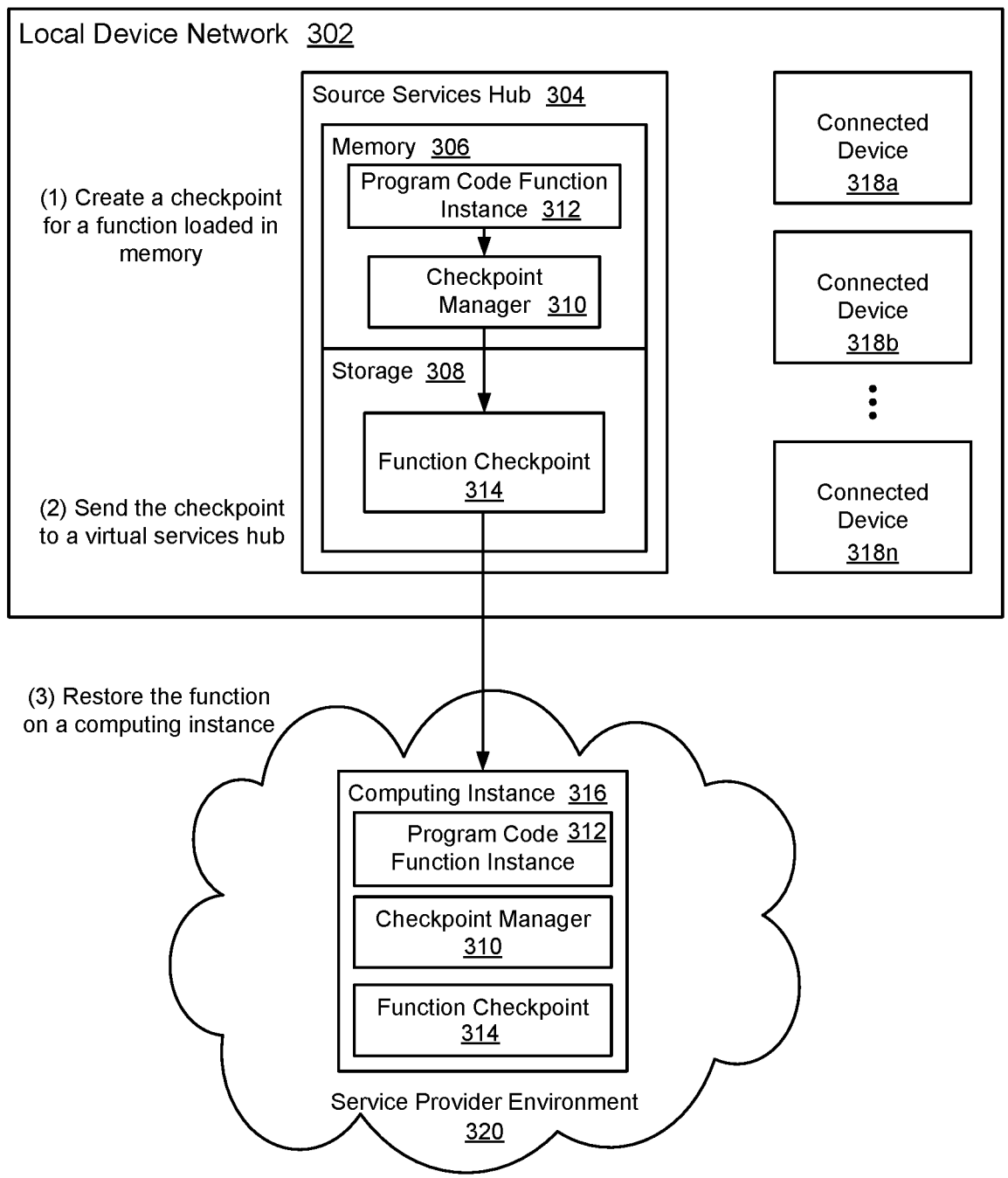
FIG. 3 illustrates an example system and method for generating a function checkpoint on a source services hub and sending the function checkpoint to a computing instance in a service provider environment.

FIG. 3 is a diagram that illustrates an example system and method used to move an instance of a program code function 312 (also referred to as a program code function instance 312) from a source services hub 304 to a computing instance 316 hosted in a service provider environment 320. FIG. 3 illustrates a case where a local device network 302 may not include an available services hub that is able to host an instance of a program code function 312 located on a source services hub 304. For example, the local device network 302 may not include additional services hubs, or other services hubs included in the local device network 302 may not be configured to host the instance of the program code function 312, or a computing workload of other services hubs in a local device network 302 may not allow the other services hubs to host the instance of the program code function 312. As a result, a function checkpoint 314 may be created for an instance of a program code function 312 located on a source services hub 304, and the instance of the program code function 312 may be resumed in a service provider environment 320 using the function checkpoint 314.

As illustrated, a computing instance 316 located in a service provider environment 320 may be used to host an instance of a program code function 312 moved from the memory 306 of a source services hub 304. The instance of the program code function 312 may be moved to the computing instance 316 by creating a function checkpoint 314 for the instance of the program code function 312. For example, as described earlier, a checkpoint manager 310 may be used to create the function checkpoint 314 for the instance of the program code function 312 in persistent storage 308 of the source services hub 304, and the source services hub 304 may send the function checkpoint 314 to the computing instance 316. The computing instance 316 may include an instance of the checkpoint manager 310, which may be used to load the instance of the program code function 312 on the computing instance 316. Connected devices 318a-n included in the local device network 302 may access a service implemented by the instance of the program code function 312 by sending requests to the computing instance 316 located in the service provider environment 320. In one example, the computing instance 316 may be implemented within the architecture of a device services network (described in relation to FIG. 7) hosted in the service provider environment 320.

In another example, a service provider environment 320 may include a function execution service (not shown) used to manage program code functions using computing resources included in the service provider environment 320. A function checkpoint 314 may be created for an instance of a program code function 312 located on a source services hub 304, and the function checkpoint 314 may be sent to the function execution service, where the function execution service may use the function checkpoint 314 to load the instance of the program code function 312 on computing resources utilized by the function execution service, thereby making the instance of the program code function 312 available to connected devices 318a-n included in the local device network 302.

Figure 4A:
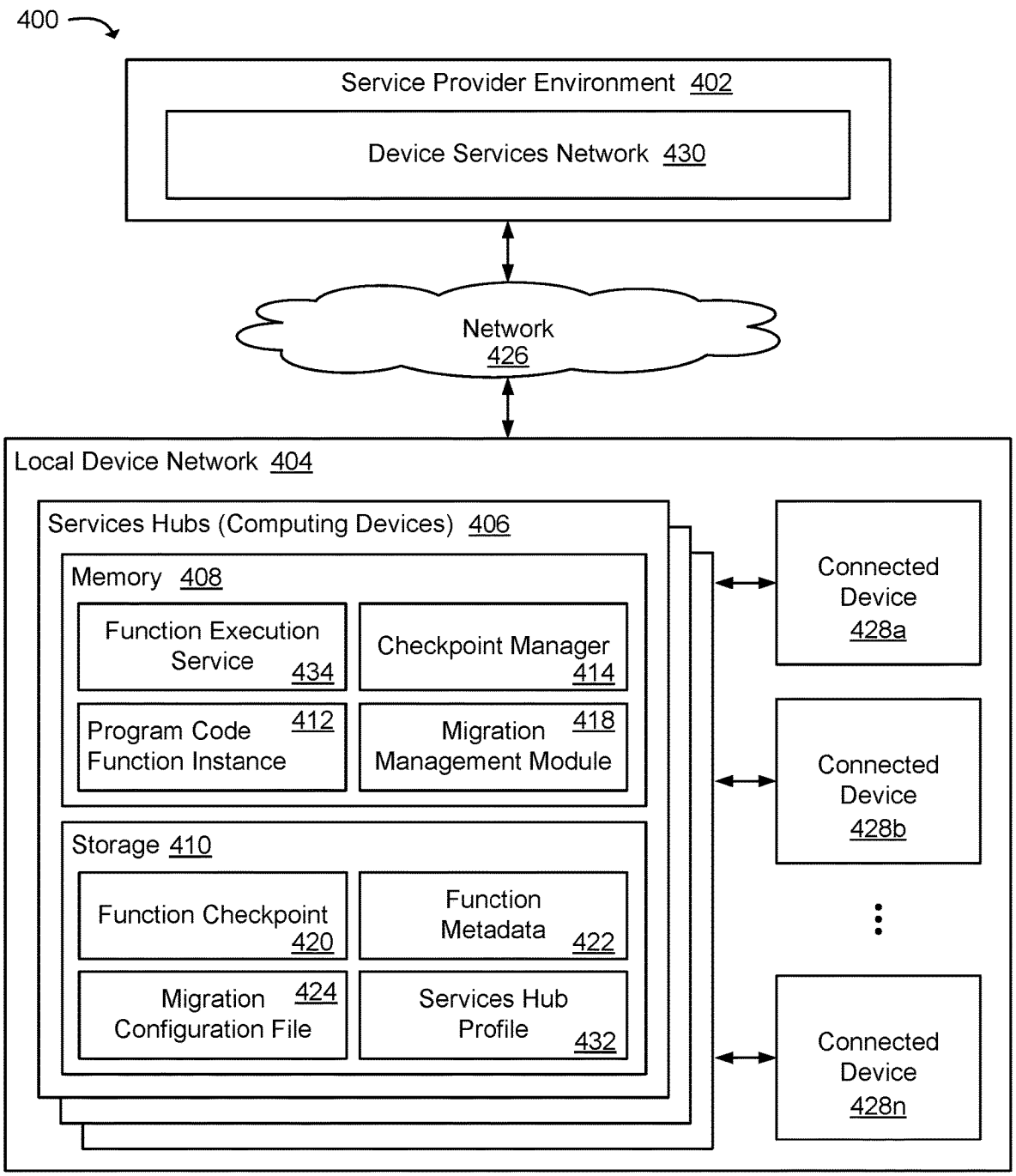
FIG. 4A is a block diagram that illustrates various example components included in a system for distributing a function checkpoint to a services hub.

FIG. 4A illustrates components of an example system environment 400 on which the present technology may be executed. The system environment 400 may include a local device network 404 that includes one or more services hubs 406, and one or more connected devices 428a-n configured to access services provided by the services hubs 406. A services hub 406 may be a computing device configured to provide services to connected devices 428a-n. Services provided by a services hub 406 may include, but are not limited to: a message service, a program code function service, a device shadowing service, and user developed services. Also, a services hub 406 may be configured to communicate with computing resources included in a device services network 430, described later in association with FIG. 7. The device services network 430 may be hosted within a service provider environment 402.

In one example, a service provider may provide services hub software to users who may install the services hub software on the users' computing devices. The services hub software, when installed on an edge computing device included in the user's local device network 404, may extend service provider environment capabilities (e.g., messaging, computing, storage, etc.) to connected devices 428a-n configured to connect to the services hub 406. In another example, a service provider may offer a dedicated services hub 406 device to users. The users may add the services hub 406 to the user's local device network 404 in order to extend service provider environment capabilities or provide localized services to connected devices 428a-n included in the user's local device network 404, as well as install the user's own software applications and program code functions.

A services hub 406 may include functionality for hosting software containers. A software container or container image may be a lightweight, stand-alone, executable software package that includes components needed to execute an instance of a program code function 412, such as, execution instructions and execution state data for a program code function, a runtime environment, system tools, system libraries, settings, etc. Moving an instance of a program code function 412 (also referred to as a program code function instance 412) from a source services hub to a destination services hub may comprise creating a checkpoint image of a software container that provides an isolated environment for the instance of the program code function 412 to execute on the source services hub, and sending the checkpoint image to be resumed on the destination services hub.

A services hub 406 may be configured to provide serverless computing functionality for executing program code functions. Illustratively, a program code function may include a segment of program code that may be like a function, and the program code function may receive parameters, perform processing, and provide return values. A services hub 406 may include a function execution service 434 that may be used to execute an instance of a program code function 412. The function execution service 434 may comprise a platform for services that execute an instance of a program code function 412. The function execution service 434 may be used to manage execution of an instance of a program code function 412 on a physical host, computing instance, or in a software container that executes code in response to requests to invoke the instance of the program code function 412, and the function execution service 434 may manage compute resources used by the instance of the program code function 412. Once an instance of a program code function 412 has been executed and results have been returned, the function execution service 434 may be used to remove the instance of the program code function 412 and results from computer memory allocated for executing the instance of the program code function 412.

In one example, a number of services hubs 406 may be logically grouped, and a group of services hubs 406 may handle data and/or requests generated by connected devices 428a-n. In one example, each services hub 406 included in a group may be capable of hosting an instance of a program code function 412 migrated between members of the group. Thus, an instance of a program code function 412 may be transparently moved to any member of the group. In another example where services hubs 406 included in a group may have different computing and/or software capabilities, the services hubs 406 in the group may be made aware of which services hubs 406 in the group are capable of hosting a particular program code function 412 via services hub profiles 432 that specify computing and/or software capabilities of the services hubs 406.

A services hub 406 may include a checkpoint manager 414 and a migration management module 418. A checkpoint manager 414 located on a source services hub may be configured to generate a function checkpoint 420 for an instance of a program code function 412, and a checkpoint manager 414 located on a destination services hub may be configured to load the instance of the program code function 412 using the function checkpoint 420. More specifically, a checkpoint manager 414 may be configured to monitor a services hub 406 for a migration event that causes an instance of a program code function 412 to be migrated from the services hub to another services hub. For example, the checkpoint manager 414 may be configured to monitor operational information of a services hub 406, such as utilization of a processor, memory, network, and/or storage, and analyze the operational information to detect a migration event. As an example, the checkpoint manager 414 may analyze operational information to detect when the health state of a services hub 406 becomes unstable (e.g., detect a software failure or hardware failure), or when the computing resources (e.g., processor, memory, storage, and/or network bandwidth) of a services hub 406 are overloaded. As another example, the checkpoint manager 414 may be configured to periodically generate function checkpoints 420 for instances of program code functions 412 loaded in memory 408 of a services hub 406 for backup to persistent storage 410 on a failover services hub in the event that the services hub 406 fails.

In response to detecting a migration event, the checkpoint manager 414 may generate a function checkpoint 420 for an instance of a program code function 412 loaded in memory 408 of a services hub 406. In one example, the checkpoint manager 414 may generate function checkpoints 420 for each instance of a program code function 412 executing on a services hub 406. For example, in response to detecting that a services hub 406 has become unstable, function checkpoints 420 may be created for each instance of a program code function 412 that is loaded in memory 408 of the services hub so that the instances of program code functions 412 can be moved to a stable services hub 406. In another example, the checkpoint manager 414 may select an instance of the program code function 412 loaded in memory 408 of a source services hub 406 to move to a destination services hub 406 and generate a function checkpoint 420 for the selected instance of the program code function 412. As a non-limiting example, in response to detecting that the computing resources of a services hub 406 are overloaded, the checkpoint manager 414 may select an instance of a program code function 412 in an execution queue (e.g., the front of the execution queue in an operating system kernel) and generate a function checkpoint 420 for the selected instance of the program code function 412.

In one example, the migration management module 418 may be used to identify an instance of a program code function 412 to migrate to a destination services hub. The checkpoint manager 414 may send a request to the migration management module 418 asking that the migration management module 418 select an instance of a program code function 412 for migration. The migration management module 418 may utilize selection criteria to identify an instance of a program code function 412 for migration. For example, the selection criteria described earlier, function type, function execution state, resource allocation, and function complete state, may be used by the migration management module 418 to select an instance of a program code function 412 for migration to a destination services hub. In another example, a migration configuration file 424 may be used to specify which instances of program code functions 412 to migrate. For example, the migration configuration file 424 may specify a resource name for a software application or program code function, and an instance of a program code function 412 loaded in memory 408 of a services hub 406 associated with the resource name may be selected for migration.

The checkpoint manager 414 may be configured to generate a function checkpoint 420 for an instance of a program code function 412. For example, the checkpoint manager 414 may suspend execution of the instance of the program code function 412, obtain execution instructions and execution state data for the instance of the program code function 412 from the memory 408 of the services hub 406, and create in storage 410 one or more function checkpoints 420 containing the execution instructions and execution state data for the instance of the program code function 412. Also, the checkpoint manager 414 in one example, or the migration management module 418 in another example, may be configured to obtain function metadata 422 associated with execution of an instance of a program code function 412 on a services hub 406. The function metadata 422 may include execution state information for an instance of a program code function 412, computing resource allocation information for the instance of the program code function 412, logging messages, command line arguments and parameters, resource name, and other function metadata 422. The function metadata 422 may be included with a function checkpoint 420 (e.g., as a separate metadata file) and the function metadata 422 may be used to load an instance of a program code function 412 on a destination services hub 406.

After generating a function checkpoint 420 for an instance of a program code function 412, the checkpoint manager 414 may cause the function checkpoint 420 to be sent to a destination services hub 406. In one example, the checkpoint manager 414 may be configured to reference a migration configuration file 424 used to define a relationship between a source services hub and one or more destination services hubs by, for example, specifying a destination services hub assigned to host instances of program code functions 412 migrated from a source services hub. In another example, the migration management module 418 may be used to identify a destination services hub based in part on a computing workload of a services hub 406. For example, the migration management module 418 may be configured to obtain workload information for services hubs 406 included in a local device network 404 and analyze the workload information to identify a services hub 406 that has a lower computing workload as compared to other services hubs 406 included in the local device network 404.

The checkpoint manager 414 may cause a function checkpoint 420 to be sent from a source services hub to a destination services hub over a local area network (LAN), or the checkpoint manager 414 may cause a function checkpoint 420 to be sent from a source services hub to the device services network 430 included in the service provider environment 402, and the device services network 430 may be used to provide the function checkpoint 420 to a destination services hub 406 included in the local device network 404. In one example, a function checkpoint 420 may be sent to the device services network 430 where the function checkpoint 420 may be used to resume an instance of a program code function 412 on a computing instance included in the device services network 430.

In response to receiving a function checkpoint 420 at a services hub 406, the checkpoint manager 414 may be configured to load an instance of a program code function 412 in memory 408 of the services hub 406 using execution instructions and execution state data included in the function checkpoint 420. For example, the checkpoint manager 414 may be configured to detect when a function checkpoint 420 has been received at a services hub 406 (e.g., by monitoring storage 410 for a function checkpoint 420) and load execution instructions and execution state data included in the function checkpoint 420 into the memory 408 of the services hub 406, thereby restoring an instance of a program code function 412 in the memory 408 of the services hub 406. Also, the checkpoint manager 414 may use function metadata 422 included with the function checkpoint 420 to restore the instance of the program code function 412. For example, function metadata 422 may be used to restore an amount of memory allocated to the instance of the program code function 412, logging messages, a function invocation count, etc.

A connected device 428*a-n* may be one of many physical electronic devices that create a large network of addressable devices and/or eventually addressable devices. A connected device 428*a-n* may be addressable over a wireless network, such as WI-FI, Zigbee, Z-Wave, BLUETOOTH, NFC (Near Field Communication), cellular, and the like. A connected device 428*a-n* may be configured to communicate with a services hub 406 over the wireless network. Also, in some examples, a connected device 428*a-n* may be configured to communicate with computing resources located in the device services network 430 and/or the service provider environment 402. For example, requests from connected devices 428*a-n* directed to services located in a service provider environment 402 may be routed through a services hub 406, or the requests may be sent directly, via a network 426, to the services located in the service provider environment 402.

In addition to services hubs 406 and connected devices 428*a-n*, the local device network 102 may include network devices (e.g., routers, switches, etc.) used to implement a local area network (LAN). The network 426 may include any useful computing network used to communicate with a service provider environment 402, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 4 illustrates that certain processing modules may be discussed in connection with this technology and these processing modules may be implemented as services. In one example configuration, a module may be considered a service with one or more processes executing on computer hardware. Such services may be centrally hosted functionality or a service application that may receive requests and provide output to other services or devices. For example, services may be considered on-demand computing that are hosted in a services hub 406, server, virtualized service environment, grid or cluster computing system. An API may be provided for each service to send requests to and receive output from the service. Such APIs may also allow third parties to interface with the service and make requests and receive output from the service. While FIG. 4 illustrates an example of a system that may implement the techniques above, many other similar or different environments are possible. The example environments discussed and illustrated above are merely representative and not limiting.

Figure 4B:
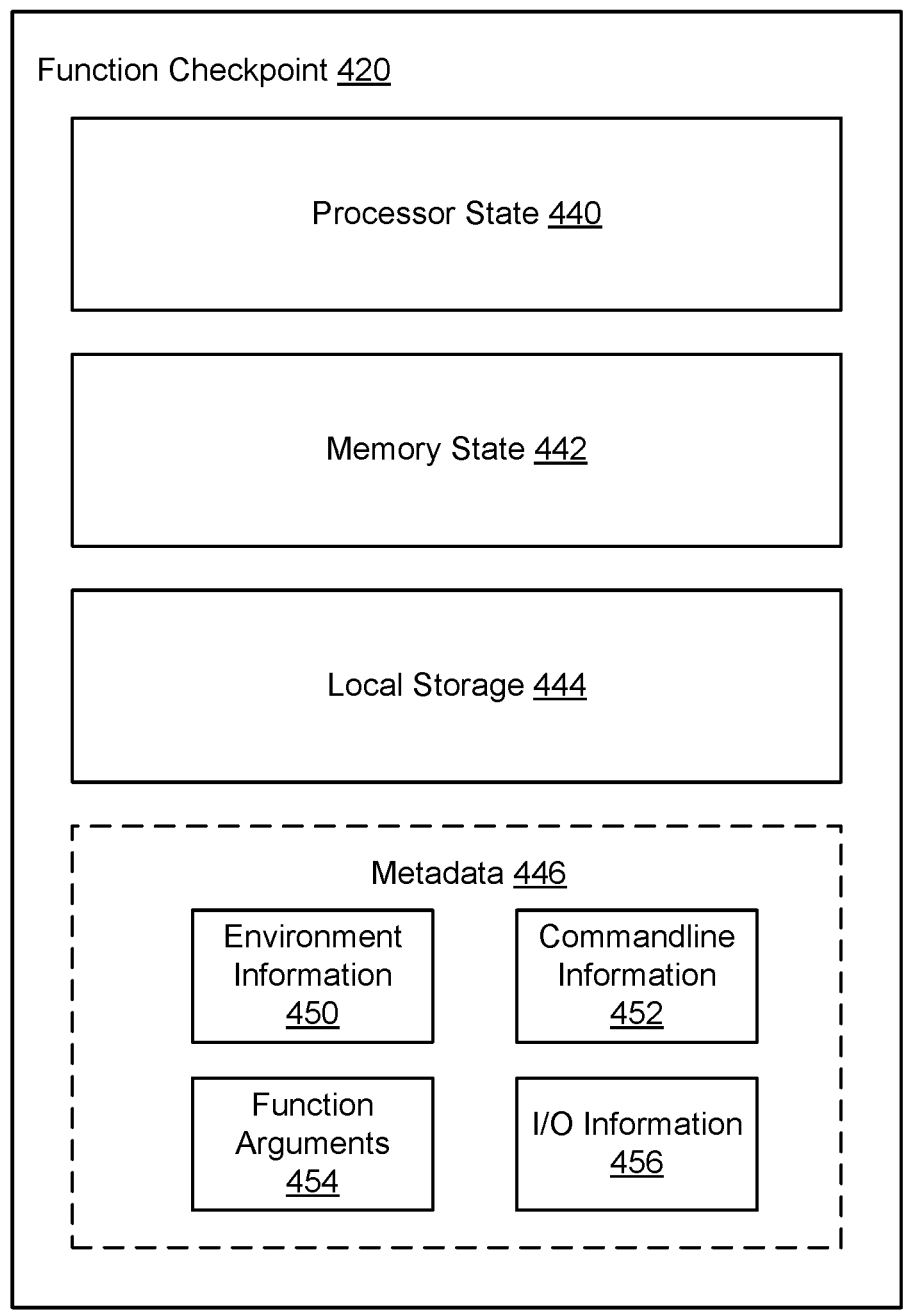
FIG. 4B illustrates a function checkpoint that may be used to preserve an execution state of an instance of a program code function.

FIG. 4B is an illustration of a function checkpoint 420 that may be used to preserve an execution state of an instance of a program code function. The function checkpoint 420 may include information to resume execution of an instance of a program code function on a destination services hub. The function checkpoint 420 may further include information maintained by one or more applications that facilitate the execution and management of program code functions, such as log files, execution statistics, and the like.

As illustrated in FIG. 4B, the function checkpoint 420 may include a processor state 440, a memory state 442, a local storage 444, and optional metadata 446. The metadata 446 may include environment information 450, command-line information 452, function arguments 454, and I/O information 456. The function checkpoint 420 may include one or more files representing the processor state 440, the memory state 442, the local storage 444, and the optional metadata 446. All or part of the files associated with the function checkpoint 420 may be compressed, encrypted, encoded, or formed from a combination thereof.

The processor state 440 may include information related to one or more processors associated with a services hub involved in the execution of an instance of a program code function. The processor state 440 may include a processor's context involved in the execution of the instance of the program code function. The processor state 440 may include, for example, a copy of the processor register values forming a processor context, including the instruction pointer for the code function. The processor state 440 may be captured into a file describing the processor context.

The memory state 442 may include information related to one or more memory devices associated with the services hub involved in the execution of the instance of the program code function. The memory state 442 may include, for example, physical memory pages allocated to or otherwise used by the instance of the program code function. In another example, the memory state 442 may include scratch memory used by a process in volatile memory. The memory state 442 may be captured into one or more memory dump files.

The local storage 444 may include information related to one or more storage devices associated with the services hub involved in the execution of the instance of the code function. The local storage 444 may include data stored by the instance of the program code function to non-volatile memory devices, such as flash storage or hard drives. The local storage 444 may include temporary data, working data, and processed results.

Additional metadata 446 related to the instance of the program code function may also be captured and included in the function checkpoint 420. The environment information 450 may include information about the environment within which the instances of the program code functions execute. The environment information 450 may include environment variables, path variables, profile information for a user executing an instance of a program code function, and the location of data files associated with the instance. The command-line information 452 may include information about the one or more commands used to instantiate the instances of the program code functions. The command-line information 452 may identify the command, command line flags, and any command line parameters used during invocation.

The function arguments 454 may include information about arguments passed to the instances of the program code functions. The function arguments 454 may include the actual arguments or references to locations where the argument values may be retrieved. The I/O information 456 may include information about input/output devices utilized by the instances of the program code functions. The I/O information 456 may include network connection information, peripheral information, user interface information, and the like.

Figure 5:
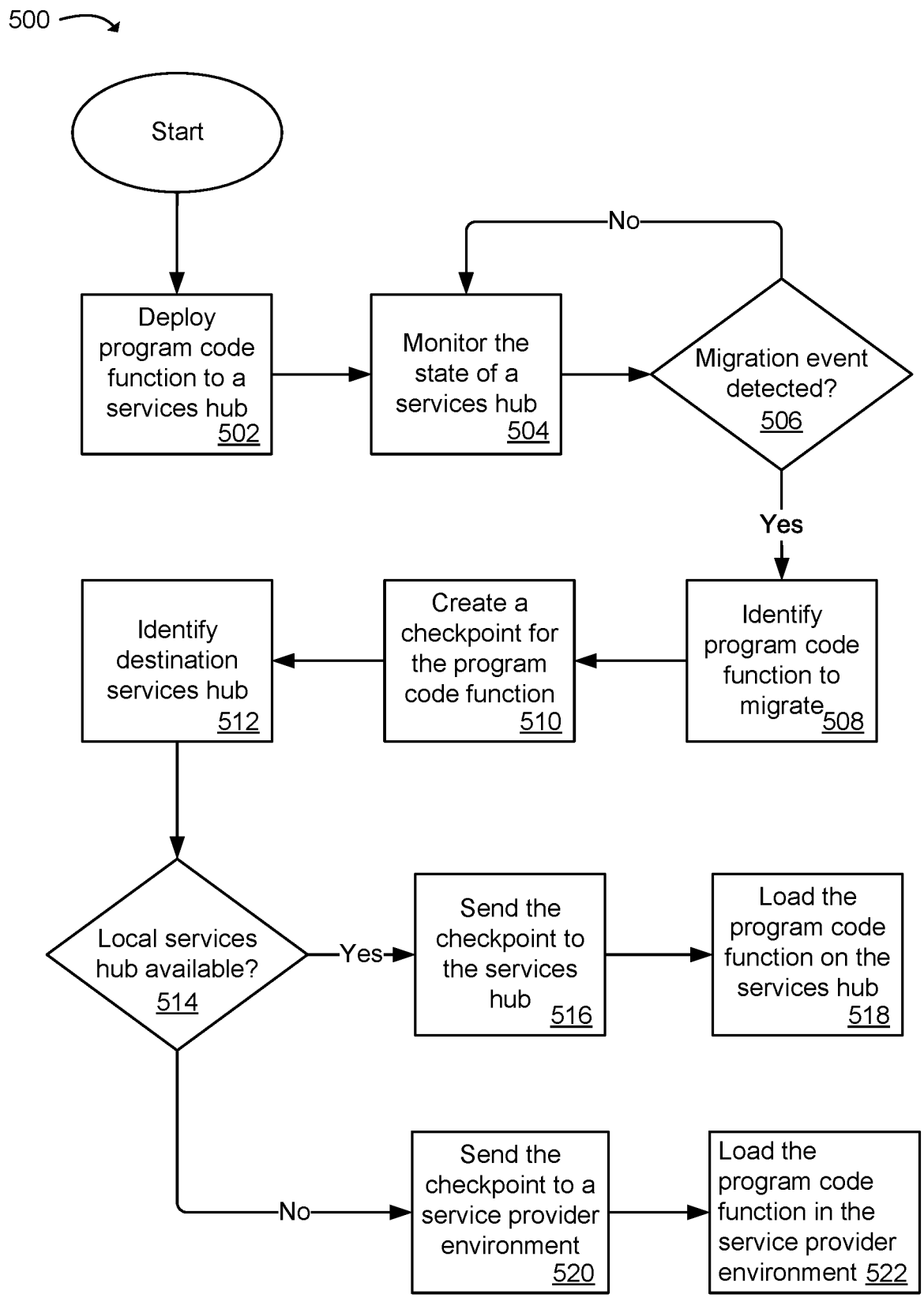
FIG. 5 is a flow diagram illustrating an example method for sending a function checkpoint to an available services hub, or sending the function checkpoint to a service provider environment when a services hub is not available.

Moving now to FIG. 5, a flow diagram illustrates an example method 500 for generating a function checkpoint for an instance of a program code function located on a first services hub and sending the function checkpoint to a second services hub where the instance of the program code function may be resumed using the function checkpoint. Starting in block 502, a program code function (or a software application) may be deployed to a services hub included in a local device network. In one example, the local device network may include multiple services hubs that are capable of executing the program code function. The program code function may be deployed to, and executed on, one of the services hubs included in the local device network without a user being explicitly aware of which services hub is used to execute the program code function. Deploying the program code function to the services hub causes an instance of the program code function to be loaded into the memory of the services hub.

As in block 504, a state of the services hub used to execute the instance of the program code function may be monitored to detect an occurrence of a migration event. A migration event may include any software or hardware event that potentially impacts execution of the instance of the program code function. For example, detecting that the computing resources of the services hub are overloaded, or detecting that the health state of the services hub has become unstable, may be migration events that cause the instance of the program code function to be migrated to different services hub.

As in block 506, in the case that a migration event is detected, then as in block 508, an instance of a program code function may be identified for migration to a different services hub. In an example where a services hub has become unstable, multiple processes may be selected for migration to a different services hub. For example, instances of program code functions that are stateful (e.g., long-lived) may be identified for migration to a different services hub in order to preserve the execution state of the instance of the program code function. In an example where the computing resources of a services hub may be overloaded, selection criteria may be used to identify one or more instances of program code functions that have an impact the computing resources, such that moving the instances of the program code functions off of the services hub may lessen the load on the computing resources.

After identifying an instance of a program code function to migrate to a different services hub, a function checkpoint may be created for the instance of the program code function, as in block 510. As described earlier, the function checkpoint may be one or more image files, a data object, or a data store record. The function checkpoint may be created by suspending execution of the instance of the program code function on the services hub and collecting execution instructions and execution state data for the instance of the program code function from the memory of the services hub. The execution instructions and execution state data may then be written to a function checkpoint (e.g., an image file, data object, or data store record) created in a persistent storage of the services hub. Also, metadata related to the execution of the instance of the program code function on the services hub may be collected and stored with the function checkpoint in persistent storage of the services hub.

As in block 512, a destination services hub may be identified. The destination services hub may be used to host the instance of the program code function. The method 500 may start by looking for an available destination services hub located in the local device network. As one example, services hubs may be paired or grouped, allowing instances of program code functions to be migrated between the services hubs. As another example, a destination services hub may be identified based in part on a computing workload of the destination services hub. For example, the computing workloads of services hubs included in the local device network may be evaluated and a destination services hub that has a lower computing workload as compared to other services hubs included in the local device network may be selected to host an instance of a program code function.

As in block 514, in the case that a destination services hub included in the local device network is identified as being available to host the instance of the program code function, then as in block 516, the function checkpoint may be sent to the destination services hub included in the local device network. In response to receiving the function checkpoint at the destination services hub, as in block 518, the function checkpoint may be used to load the instance of the program code function on the services hub. For example, the instance of the program code function may be recreated in the memory of the destination services hub using the execution instructions and execution state data included in the function checkpoint. Also, metadata included with the function checkpoint may be used to recreate the instance of the program code function on the destination services hub. For example, the metadata may be used to load computing resource allocation information for the instance of the program code function, logging messages, command line arguments and/or parameters, etc.

In the case that a services hub included in the local device network is not available to host the instance of the program code function, then as in block 520, the function checkpoint may be sent to a service provider environment, where as in block 522, the instance of the program code function may be loaded or recreate using computing resources located in the service provider environment. For example, the instance of the program code function may be loaded on a server or a computing instance located in the service provider environment using the function checkpoint.

Figure 6:
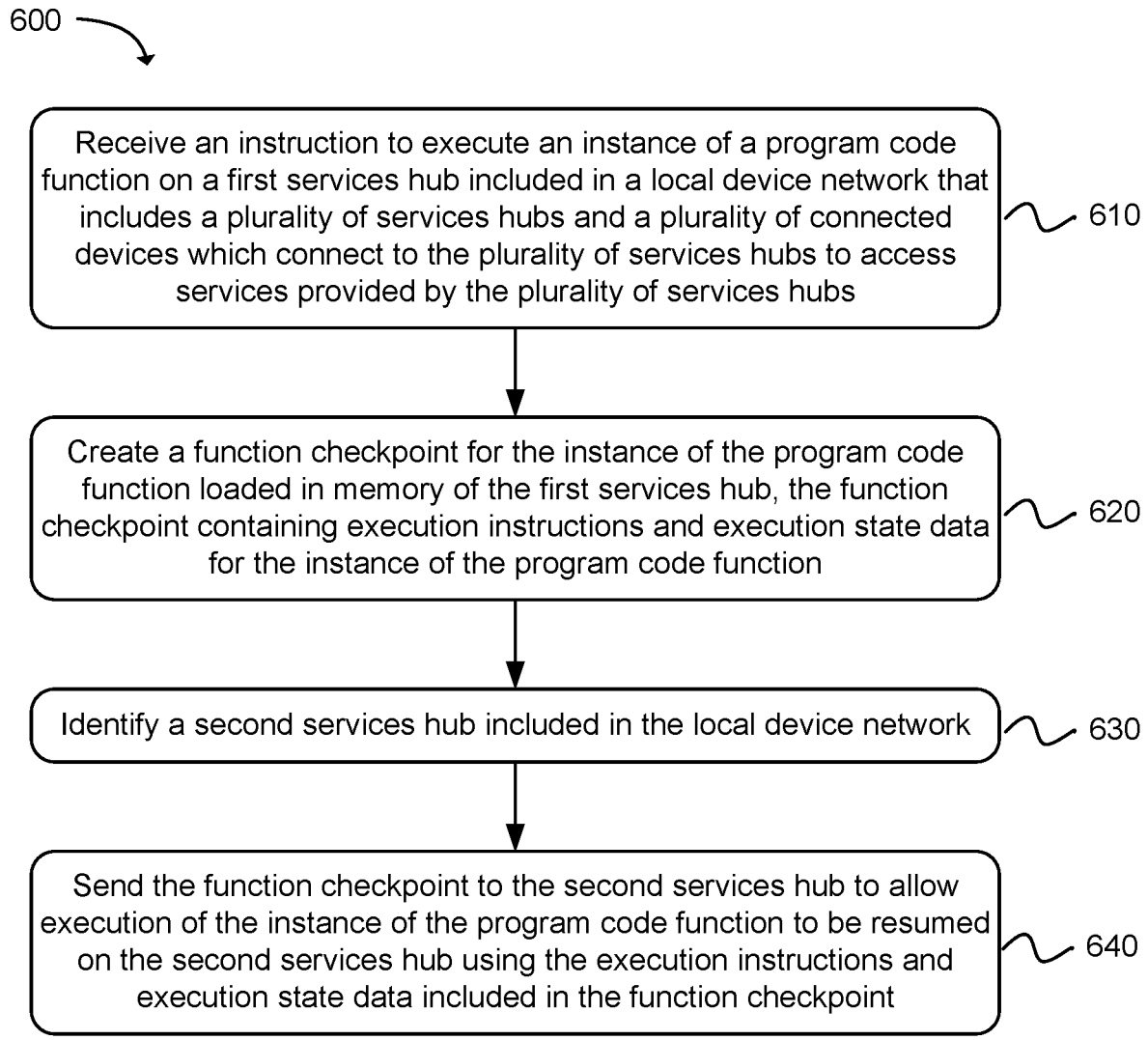
FIG. 6 is a flow diagram illustrating an example method for creating a function checkpoint on a first services hub and sending the function checkpoint to a second services hub so an instance of a program code function can be resumed on the second services hub using the function checkpoint.

FIG. 6 is a flow diagram illustrating an example method 600 for creating a function checkpoint for an instance of a program code function on a first services hub and sending the function checkpoint to a second services hub so that the instance of the program code function can be resumed on the second services hub. As in block 610, an instruction to execute an instance of a program code function may be received on a first services hub included in a local device network comprising a plurality of services hubs and a plurality of connected devices which connect to the plurality of services hubs to access a service provided by the plurality of services hubs. In one example, a software application or program code function may be deployed to a group of services hubs in a local device network, where any of the services hubs may execute an instance of the software application or program code function.

As in block 620, a function checkpoint for the instance of the program code function loaded in memory of the first services hub may be created. The function checkpoint may contain execution instructions and execution state data for the instance of the program code function. In one example, creating the function checkpoint may include suspending execution of the instance of the program code function on the first services hub, and retrieving the execution instructions and execution state data from the memory of the first services hub. In some examples, creating the function checkpoint comprises creating an image of a software container that provides an isolated environment for the instance of the program code function to execute. Also, in one example, metadata related to execution of the instance of the program code function on the first services hub may be obtained, and the metadata may be included in, or with, the function checkpoint. The function checkpoint (and metadata) may be stored to persistent storage located on the first services hub.

As in block 630, a second services hub included in the local device network may be identified, and as in block 640, the function checkpoint may be sent to the second services hub to allow execution of the instance of the program code function to be resumed on the second services hub using the function checkpoint. In one example, the function checkpoint may be sent to the second services hub over a local area network. In another example, the function checkpoint may be sent to a checkpoint storage in a service provider environment, and the second services hub may retrieve the function checkpoint from the checkpoint storage in the service provider environment. In one example, the function checkpoint may be saved to a device representation (e.g., a shadow copy of a device state) used to represent a state of the second services hub in the service provider environment, and the second services hub may retrieve the function checkpoint from the device representation located in the service provider environment.

After receiving the function checkpoint, the second services hub may store the function checkpoint to persistent storage located on the second services hub, and then resume the execution state of the instance of the program code function in memory of the second services hub using the execution instructions and the execution state data included in the function checkpoint. In an alternative example, the function checkpoint may be sent to a service provider environment, where the instance of the program code function may be resumed on a computing instance located in the service provider environment using the execution instructions and the execution state data included in the function checkpoint.

Figure 7:
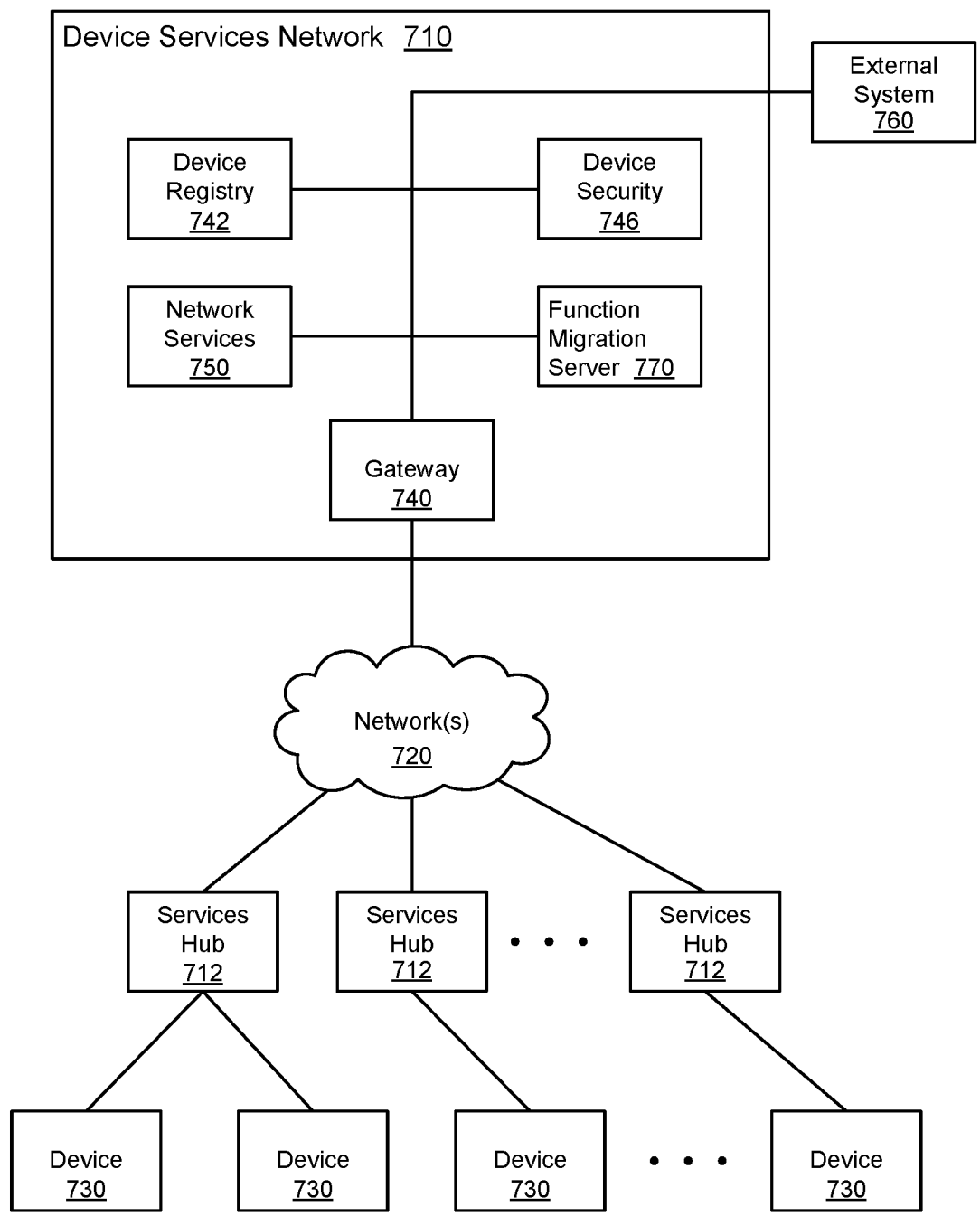
FIG. 7 is a block diagram illustrating an example computer networking architecture for a device services network.

FIG. 7 is a block diagram illustrating an example device services network 710 with which the devices described earlier may communicate. The device services network 710, which may be referred to as a device communication environment or system that comprises various resources made accessible via a gateway server 740 to services hubs 712 and devices 730 that access the gateway server 740 via a network 720, such as a local wireless network that provides access to a wide area network. The devices 730 may access the device services network 710 through the services hubs 712 in order to access network and device services, such as data storage and computing processing features. Services operating in the device services network 710 may communicate data and publication messages to the devices 730, via the services hubs 712, in response to requests from the devices 730 and/or in response to computing operations within the services.

The device services network 710 may comprise communicatively coupled component systems 740, 742, 746, 750 and 770 that operate to provide services to the devices 730. The gateway server 740 may be configured to provide an interface between the devices 730 and the device services network 710. The gateway server 740 receives requests from the devices 730 and forwards corresponding data and publication messages to the appropriate systems within the device services network 710. Likewise, when systems within the device services network 710 attempt to communicate data instructions to the devices 730, the gateway server 740 routes those requests to the correct device 730.

The gateway server 740 may be adapted to communicate with varied devices 730 using various different computing and communication capabilities. For example, the gateway server 740 may be adapted to communicate using either TCP (Transmission Control Protocol) or UDP (User Datagram Protocol) protocols. Likewise, the gateway server 740 may be programmed to receive and communicate with the devices 730 using any suitable protocol including, for example, MQTT (Message Queue Telemetry Transport), CoAP (Constrained Application Protocol), HTTP (Hypertext Transfer Protocol), and HTTPS (HTTP secure). The gateway server 740 may be programmed to convert the data and instructions or publication messages received from the devices 730 into a format that may be used by other server systems comprised in the device services network 710. In one example, the gateway server 740 may be adapted to convert a publication message received using the HTTPS protocol into a JSON (JavaScript Object Notation) formatted publication message that is suitable for communication to other servers within the device services network 710.

The gateway server 740 may store, or may control the storing, of information regarding the devices 730 that have formed a connection to the particular gateway server 740 and for which the particular gateway server 740 may be generally relied upon for communications with the device 730. In one example, the gateway server 740 may have stored thereon information specifying the particular device 730 such as a device identifier. For each connection established from the particular device 730, the gateway server 740 may also maintain information identifying the connection. For example, a connection identifier may be generated and stored for each connection established with a particular device 730. Information relating to the particular connection may also be stored. For example, information identifying the particular socket of the gateway server 740 on which the connection was established, as well as information identifying the particular protocol used by the device 730 on the connection may be stored by the gateway server 740.

Information such as the socket and protocol may be used in order to facilitate further communications via the particular connection.

In one example, the gateway server 740 may communicate via any suitable networking technology with a device registry server 742. The device registry server 742 may be adapted to track the attributes and capabilities of each device 730. In an example, the device registry sever 742 may be provisioned with information specifying the attributes of the devices 730. The device registry server 742 may comprise data specifying rules or logic (e.g., automation rules) for handling various requests that may be received from the devices 730. The device registry server 742 may be programmed to convert specialized device functions or commands received in particular communication protocols such as, for example HTTPS, MQTT, CoAP, into functions or commands using particular protocols that are understood by other of the servers in the device services network 710. In one example, the device registry server 742 may be provisioned with information specifying that upon receipt of a particular request from a particular device 730, a request should be made to store the payload data of the request in a particular network service server 750. The device registry server 742 may be similarly programmed to receive requests from servers 742, 750 and convert those requests into commands and protocols understood by the devices 730.

In some examples, the device services network 710 may include a function migration server 770. The function migration server 770 may be configured to forward a function checkpoint to a destination services hub. For example, in response to receiving a function checkpoint, the function migration server 770 may identify a destination services hub, and send the function checkpoint to the destination services hub.

The device security server 746 maintains security-related information for the devices 730 that connect to the device services network 710. In one example, the device security server 746 may be programmed to process requests to register devices 730 with the device services network 710. For example, entities such as device manufacturers, may forward requests to register devices 730 with the device services network 710. The device security server 746 receives registration requests and assigns unique device identifiers to devices 730 which use the device identifiers on subsequent requests to access the device services network 710. The device security server 746 stores, for each registered device, authentication information that may be provided during the device registration process. For example, a request to register a device 730 may comprise information identifying the device 730 such as a device serial number and information for use in authenticating the device 730. In one example, the information may comprise a digital certificate and may comprise a public key of a public key-private key pair. The information may be stored in relation to the assigned device identifier for the particular device 730. When the device 730 subsequently attempts to access the device services network 710, the request may be routed to the device security server 746 for evaluation. The device security server 746 determines whether authentication information provided in the request is consistent with the authentication information stored in relation to the device identifier and provided during the registration process.

The device security server 746 may be further programmed to process request to associate particular entities (individuals or organizations) with particular devices 730. The device security server 746 may be adapted to receive requests to register entities, which may be, for example, individuals, users, accounts, and/or organizations, as authorized to control or communicate with a particular device 730. In one example, a request may be received from an individual or organization that may have purchased a device 730 from a manufacturer. For example, the device may be a dishwasher, thermostat, or lighting assembly that an individual or organization purchased from the manufacturer. The individual or organization may initiate a request to register the device 730 with the individual or an organization with which the organization is associated. The request may be routed to a web services server which may be comprised in device services network 710 or which communicates the request to the device services network 710. The request identifies the device 730 and the particular entity (individual or organization) that is requesting to be associated with the device 730. In one example, the request may comprise a unique device identifier that was assigned when the device 730 was registered with the system. The request further may comprise information uniquely identifying the entity that is registering as having authority to communicate with and/or control the particular device 730.

The device security server 746 stores the information identifying the particular entity in relation with the device identifier. When the particular entity subsequently attempts to control or communicate data to the particular device 730, the device security server 746 may use the information to confirm that the particular entity is authorized to communicate with or control the particular device 730. When an entity that has not been registered as being authorized to communicate with the device 730 attempts to communicate with or control the device 730, the device security server 746 may use the information stored in the device security server 746 to deny the request.

A network services server 750 may be any resource or processing server that may be used by any of servers 740, 742, 746, or 770 in processing requests from the devices 730. In one example, network services server 750 may provide data storage and retrieval services and/or on-demand processing capacity. In an example scenario, the network services server 750 may be any of numerous network accessible services including, for example, web or cloud-based services. In one example, the web services server 750 may be programmed to provide particular processing for particular devices 730 and/or groups of devices 730.

Servers 740, 742, 746, 750, and 770 may be communicatively coupled via any suitable networking hardware and software. For example, the servers may communicate via a local area network or wide area network.

An external system 760 may access device services network 710 for any number of purposes. In one example, an external system 760 may be a system adapted to forward requests to register devices 730 with the device services network 710. For example, an external system 760 may include a server operated by or for a device manufacturer that sends requests to device services network 710, and device security server 746 in particular, to register devices 730 for operation with device services network 710. Similarly, the external system 760 may be a system operated to provide a gateway for entities (individuals or organizations) to register an ownership or control relationship with a particular device 730.

The devices 730 may be any device that may be communicatively coupled via a services hub 712 or a network 720, with the device services network 710. For example, the devices 730 may be computing devices such as smart phones and tablet computers, automobiles, appliances such as washers and driers, industrial sensors, switches, control systems, etc. In one example, each of the devices 730 may communicate over the network 720 to store data reflecting the operations of the particular device 730 and/or to request processing provided by, for example, network services server 750. While FIG. 7 depicts three devices 730, it will be appreciated that any number of devices 730 may access the device services network 710 via the gateway server 740. Further it will be appreciated that the devices 730 may employ various different communication protocols. For example, some devices 730 may transport data using TCP, while others may communicate data using UDP. Some devices 730 may use MQTT, while others may use CoAP, and still others may use HTTPs. It will also be appreciated that each of devices 730 may be programmed to send and receive particular functions or commands in its requests that are not compatible with other devices or even the systems within device services network 710. The gateway server 740 may be programmed to receive and, if needed, attend to converting such requests for processing with the device services network 710.

Figure 8:
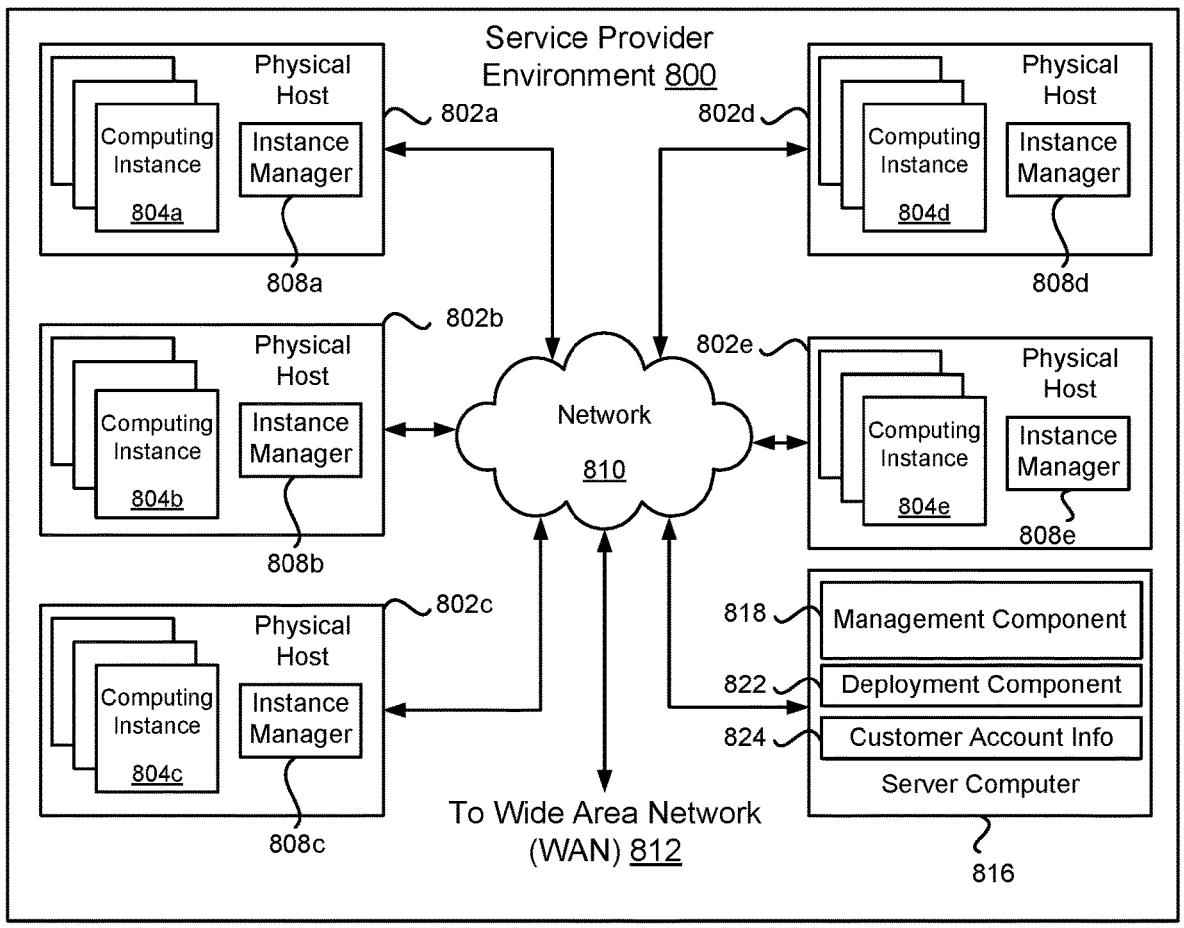
FIG. 8 is a block diagram that illustrates an example service provider environment.

FIG. 8 is a block diagram illustrating an example service provider environment 800 that may be used to implement the device services network described above. The service provider environment 800 may include computing resources that may include physical hosts 802a-e, computing instances 804a-e, virtualized services, and other types of computing resources which may be available for purchase and use by customers of a computing service provider. The computing resources may have many different configurations of processor capabilities, main memory, disk storage, and operating system. In particular, the service provider environment 800 depicted illustrates one environment in which the technology described herein may be used.

The service provider environment 800 may be one type of environment that includes various virtualized service resources that may be used, for instance, to host computing instances 804a-e. For example, the service provider environment 800 may offer virtual or hardware devices, database resources and instances, file or block data storage resources, and/or networking resources, such as load balancing resources, domain name service ("DNS") resources, virtual private cloud ("VPC") resources, virtual local area network ("VLAN") resources, and/or other types of hardware and software computing resources or network services on a permanent or as-needed basis. The computing resources can also include, but are not limited to, computing instances 804a-e and images, security groups, option groups, gateways, option sets, network access control lists ("ACLs"), subnets, storage buckets, network interfaces, snapshots, spot market requests, and storage volumes.

The computing resources described above may be provided in one particular implementation by one or more data centers operated by a service provider. As known to those skilled in the art, data centers are facilities utilized to house and operate computer systems and associated components. Data centers also typically include redundant and backup power, communications, cooling, and security systems. The data centers can be located in geographically disparate regions, and can also be connected to various other facilities, such as co-location facilities, and various wide area networks 812 ("WANs"), such as the Internet.

The service provider environment 800 may be capable of delivery of computing, storage and networking capacity as a software service to a community of end recipients. In one example, the service provider environment 800 may be established for an organization by or on behalf of the organization. That is, the service provider environment 800 may offer a "private cloud environment." In another example, the service provider environment 800 may support a multi-tenant environment, wherein a plurality of customers may operate independently (i.e., a public cloud environment). Generally speaking, the service provider environment 800 may provide the following models: Infrastructure as a Service ("IaaS"), Platform as a Service ("PaaS"), and/or Software as a Service ("SaaS"). Other models may be provided. For the IaaS model, the service provider environment 800 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the service provider environment 800. End customers may access the service provider environment 800 using networked client devices, such as desktop computers, laptops, tablets, smartphones, etc. running web browsers or other lightweight client applications, for example. Those familiar with the art will recognize that the service provider environment 800 may be described as a "cloud" environment.

The particularly illustrated service provider environment 800 may include a plurality of server computers 802a-e. While four server computers are shown, any number may be used, and large data centers may include thousands of server computers. The service provider environment 800 may provide computing resources for executing computing instances 804a-e. Computing instances 804a-e may, for example, be virtual machines. A virtual machine may be an instance of a software implementation of a machine (i.e. a computer) that executes applications like a physical machine. In the example of a virtual machine, each of the server computers 802a-e may be configured to execute an instance manager 808a-e capable of executing the instances. The instance manager 808a-e may be a hypervisor, virtual machine monitor (VMM), or another type of program configured to enable the execution of multiple computing instances 804a-e on a single server. Additionally, each of the computing instances 804a-e may be configured to execute one or more applications.

One or more server computers 816 may be reserved to execute software components for managing the operation of the service provider environment 800 and the computing instances 804a-e. For example, a server computer 816 may execute a management component 818. A customer may access the management component 818 to configure various aspects of the operation of the computing instances 804a-e purchased by a customer. For example, the customer may setup computing instances 804a-e and make changes to the configuration of the computing instances 804a-e.

A deployment component 822 may be used to assist customers in the deployment of computing instances 804a-e. The deployment component 822 may have access to account information associated with the computing instances 804a-e, such as the name of an owner of the account, credit card information, country of the owner, etc. The deployment component 822 may receive a configuration from a customer that includes data describing how computing instances 804a-e may be configured. For example, the configuration may include an operating system, provide one or more applications to be installed in computing instances 804a-e, provide scripts and/or other types of code to be executed for configuring computing instances 804a-e, provide cache logic specifying how an application cache should be prepared, and other types of information. The deployment component 822 may utilize the customer-provided configuration and cache logic to configure, prime, and launch computing instances 804a-e. The configuration, cache logic, and other information may be specified by a customer accessing the management component 818 or by providing this information directly to the deployment component 822.

Customer account information 824 may include any desired information associated with a customer of the multi-tenant environment. For example, the customer account information may include a unique identifier for a customer, a customer address, billing information, licensing information, customization parameters for launching instances, scheduling information, etc. As described above, the customer account information 824 may also include security information used in encryption of asynchronous responses to API requests. By "asynchronous" it is meant that the API response may be made at any time after the initial request and with a different network connection.

A network 810 may be utilized to interconnect the service provider environment 800 and the server computers 802a-e, 816. The network 810 may be a local area network (LAN) and may be connected to a Wide Area Network (WAN) 812 or the Internet, so that end customers may access the service provider environment 800. The network topology illustrated in FIG. 8 has been simplified, many more networks and networking devices may be utilized to interconnect the various computing systems disclosed herein.

Figure 9:
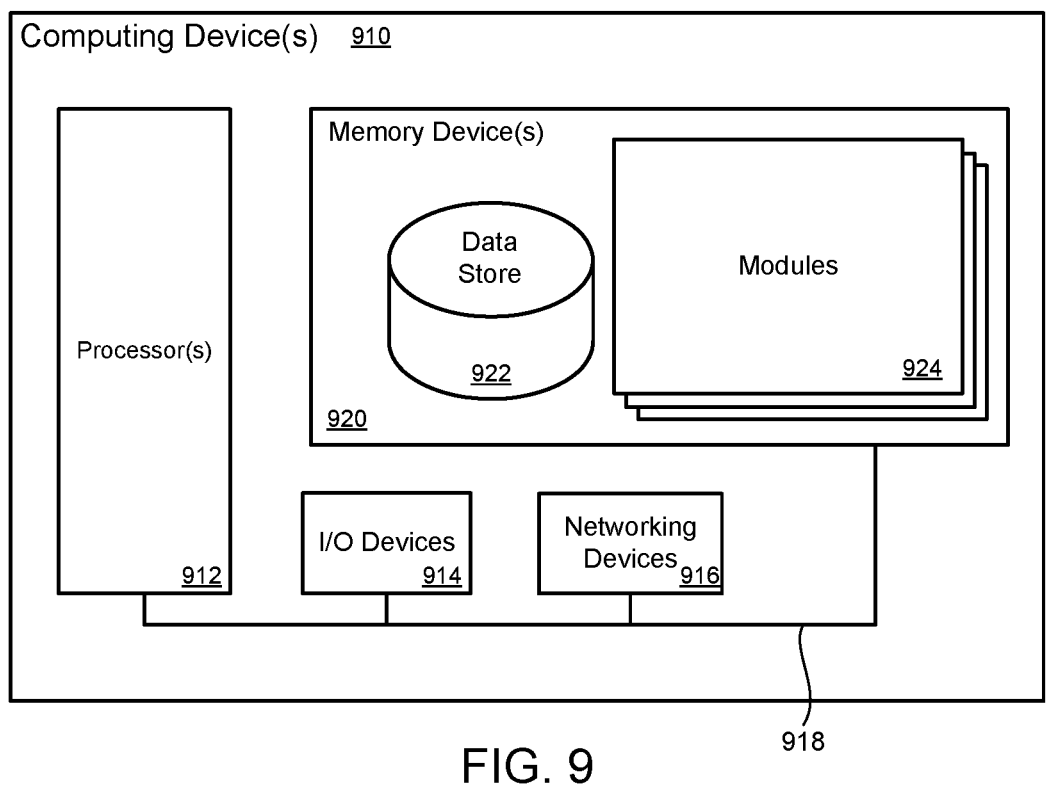
FIG. 9 is block diagram illustrating an example of a computing device that may be used to execute a method for distributing a function checkpoint to a services hub.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 924 that are executable by the processor(s) 912 and data for the modules 924. In one aspect, the memory device 920 may include a checkpoint manager, a migration management module, and other modules. In another aspect, the memory device 920 may include a network connect module and other modules. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high-level programming languages that are compiled, interpreted or executed using a hybrid of the methods.

The computing device may also have access to I/O (input/output) devices 914 that are usable by the computing devices. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory device 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media.

Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system, comprising:
   at least one processor;
   at least one memory device including instructions that, when executed by the at least one processor, cause the system to:
   receive, at a first services hub, a program code function, wherein the first services hub is included in a local device network that includes a plurality of services hubs and a plurality of connected devices that connect to the plurality of services hubs to access services provided by the plurality of services hubs;
   receive an instruction to execute an instance of the program code function on the first services hub;
   suspend execution of the instance of the program code function on the first services hub;
   obtain execution instructions and execution state data for the instance of the program code function from the at least one memory device of the first services hub;
   create a function checkpoint containing the execution instructions and execution state data to preserve an execution state of the instance of the program code function;
   identify a second services hub included in the local device network that is available to execute the instance of the program code function on the second services hub based in part on the execution instructions and the execution state data contained in the function checkpoint; and
   send the function checkpoint from the first services hub to the second services hub to enable loading of the execution state of the instance of the program code function using the execution instructions and the execution state data included in the function checkpoint.

2. The system as in claim 1, wherein the memory device includes instructions that, when executed by the at least one processor, cause the system to further:
   obtain metadata related to execution of the instance of the program code function on the first services hub; and
   include the metadata with the function checkpoint.

3. The system as in claim 1, wherein the memory device includes instructions that, when executed by the at least one processor, cause the system to store the function checkpoint to persistent storage located on the first services hub.

4. The system as in claim 1, wherein the second services hub receives the function checkpoint from the first services hub, stores the function checkpoint to persistent storage located on the second services hub, and loads the execution state of the instance of the program code function in memory of the second services hub using the execution instructions and the execution state data included in the function checkpoint.

5. A computer implemented method, comprising:
   receiving an instruction to execute an instance of a program code function on a first services hub included in a local device network that includes a plurality of services hubs and a plurality of connected devices which connect to the plurality of services hubs to access services provided by the plurality of services hubs;
   creating a function checkpoint to preserve an execution state of the instance of the program code function loaded in memory of the first services hub, the function checkpoint containing execution instructions and execution state data for the instance of the program code function;
   identifying a second services hub included in the local device network; and
   sending the function checkpoint to the second services hub to allow the instance of the program code function to be executed on the second services hub based in part on the execution instructions and execution state data included in the function checkpoint.

6. The method as in claim 5, further comprising:
suspending execution of the instance of the program code function on the first services hub; and
retrieving the execution instructions and execution state data from the memory of the first services hub.

7. The method as in claim 5, further comprising:
detecting that a health state of the first services hub is unstable; and
selecting the instance of the program code function to move to the second services hub.

8. The method as in claim 5, further comprising:
detecting that computing resources on the first services hub are overloaded; and
selecting the instance of the program code function to move to the second services hub.

9. The method as in claim 5, further comprising selecting the instance of the program code function to move to the second services hub using selection criteria, including a function type, a function execution state, or a function completion state.

10. The method as in claim 5, wherein identifying the second services hub included in the local device network further comprises referencing a migration configuration file that assigns the second services hub to host the instance of the program code function.

11. The method as in claim 5, wherein identifying the second services hub included in the local device network further comprises identifying the second services hub based in part on a computing workload of the second services hub.

12. The method as in claim 5, wherein creating the function checkpoint further comprises creating an image of a software container that provides an isolated environment for executing the instance of the program code function.

13. The method as in claim 5, wherein creating the function checkpoint further comprises periodically creating the function checkpoint for backup to a persistent storage on the second services hub.

14. The method as in claim 5, wherein sending the function checkpoint to the second services hub further comprises sending the function checkpoint over a local area network to the second services hub.

15. The method as in claim 5, wherein sending the function checkpoint to the second services hub further comprises sending the function checkpoint to a checkpoint storage in a service provider environment, and the function checkpoint is retrievable from the checkpoint storage in the service provider environment by the second services hub.

16. The method as in claim 5, wherein creating the function checkpoint and sending the function checkpoint to the second services hub further comprises:

creating the function checkpoint in a volatile memory on the first services hub; and
sending the function checkpoint over a network to the second services hub, wherein the second services hub loads the instance of the program code function in a volatile memory on the second services hub using the execution instructions and the execution state data included in the function checkpoint.

17. The method as in claim 5, further comprising deploying a program code function to a group of services hub to be hosted on a services hub included in the group of services hubs.

18. A non-transitory machine readable storage medium including instructions embodied thereon, the instructions when executed by one or more processors:
invoke an instance of a program code function on a first services hub which is included in a local device network that includes a plurality of services hubs and a plurality of connected devices which connect to the services hubs to access a service provided by the plurality of services hubs;
suspend execution of the instance of the program code function on the first services hub;
obtain execution instructions, execution state data, and function metadata for the instance of the program code function;
create a function checkpoint containing the execution instructions, the execution state data, and the function metadata to preserve an execution state of the function checkpoint; and
send the function checkpoint to a service provider environment to be stored in the service provider environment and to enable the function checkpoint to be retrieved by a second services hub allowing the second services hub to execute the instance of the program code function on the second services hub based in part on the execution instructions and the execution state data included in the function checkpoint.

19. The non-transitory machine readable storage medium in claim 18, wherein the function checkpoint is saved to a device representation used to represent the state of the second services hub in the service provider environment, and the second services hub retrieves the function checkpoint from the device representation.

20. The non-transitory machine readable storage medium in claim 18, wherein the second services hub is a computing instance located in the service provider environment, and the execution state of the instance of the program code function is loaded on the computing instance.

* * * * *